3,354,152
2β,3β - ALKYLIDENEDIOXY - 6 - OXYGENATED-
Δ⁷-STEROIDS AND PROCESS FOR THE PREP-
ARATION THEREOF
John A. Edwards, John H. Fried, and John B. Siddall,
Palo Alto, Calif., assignors to Syntex Corporation,
Panama, Panama, a corporation of Panama
No Drawing. Filed Jan. 26, 1966, Ser. No. 523,032
14 Claims. (Cl. 260—239.55)

This is a continuation-in-part of copending application Ser. No. 506,410 filed Nov. 4, 1965.

The present invention is directed at novel polyhydroxy steroids and to processes for their preparation. Specifically, this invention is directed at a process for preparing compounds of the formula:

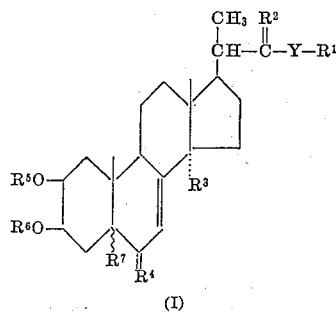

wherein $R^1$ is hydrogen, hydroxy, tetrahydropyranyloxy or a hydrocarbon carboxylic acyloxy group of less than 12 carbon atoms;
$R^2$ is an oxygen atom or (hydrogen, hydroxy);
$R^3$ is hydrogen or hydroxy;
$R^4$ is an oxygen atom or (hydrogen, hydroxy);
Each of $R^5$ and $R^6$ is hydrogen or a hydrocarbon carboxylic acyl group of less than 12 carbon atoms, or taken together, the group

in which each A and B is hydrogen or lower alkyl;
$R^7$ is α-hydrogen, β-hydrogen or α-hydroxy; and
Y is an alkylene group of from 3 to 8 carbon atoms, there being at least 3 carbon atoms between the valence bonds of said alkylene group. Moreover, the present invention is directed at the novel compounds of the above formula wherein $R^1$, $R^2$, $R^3$, $R^4$, $R^5$, $R^6$, $R^7$ and Y are as defined but characterized by the proviso that when $R^1$, $R^2$ and $R^3$ are all hydroxy, at least one of $R^4$ and $R^7$ is also hydroxy.

The presence of "asymmetric" carbon atoms in several positions of the above formula permit the existence of isomeric forms. As noted in greater detail hereafter, the methods of the present invention generate both forms, unless otherwise noted, and these forms may be readily separated from one another through conventional methods, e.g., chromatography, fractional crystallization, or the like. Unless otherwise noted, all such isomeric forms are embraced by the present invention. Use of a wavy line, "⌇," indicates both α and β configurations, either singularly or collectively. With specific reference to the configuration at C-20 and C-22, the designations α and β are used in accordance with the Fischer convention.

The term alkyl and derivations thereof such as alkylene, alkanoic, etc., denotes an aliphatic hydrocarbon group. When qualified by the term "lower," such a group will contain no more than 6 carbon atoms. The alkylene group designated by Y will contain from 3 to 8 carbon atoms, but in all cases will comprise a straight chain of 3 carbon atoms between $R^1$ and the remainder of the nucleus. This chain of 3 or more carbon atoms may, however, be substituted by one or more alkyl groups of 5 or less carbon atoms.

The hydrocarbon carboxylic acyl and acyloxy groups of the present invention will contain less than 12 carbon atoms and may be of a straight, branched, cyclic or cyclic-aliphatic chain structure which is saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentyl-propionate, aminoacetate, β-chloroproprionate, adamantoate, and the like.

The foregoing compounds demonstrate the ability to affect the growth of insects and are accordingly useful in the control and management of insect population, in addition to finding broad use in biological research. They may be employed for insect control in the same manner as the related insect hormone, ecdysone, whose structure and use are known. Furthermore, the process of the present invention is particularly valuable in synthesizing this compound, and many of the compounds of the present invention also serve as valuable intermediates in that synthesis.

The preparation of the compounds of the present invention, and with the appropriate selection of reagents, ecdysone, is described in the copending application specified above. Among the processes therein set forth in detail is the multistep conversion of a 3β-acyloxy-22,23-bis-norchol-5-enoic acid alkyl ester to 2β,3β-alkylidenedioxy-6-hydroxy-22,23-bisnorchol-7-enoic acid alkyl esters of the formula:

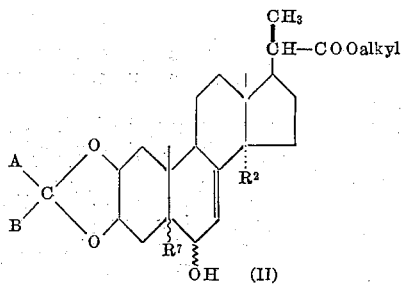

wherein A, B, $R^3$ and $R^7$ are as previously defined. Also set forth in said copending application is the subsequent conversion of compounds of Formula II, particularly those compounds wherein $R^7$ is β-hydrogen and $R^3$ is hydroxy, to various 5β-cholest-7-ene derivatives of Formula I. Utilizing the carbonyl group of the alkyl ester as the reaction site, this latter conversion employs various Grignard reagents in introducing the remainder of the side chain. The resultant compounds having a 22-keto group are then reduced to the corresponding 22α- and 22β-hydroxy derivatives with subsequent selective oxidation of the 6-hydroxy group, if desired, to yield the 6-keto compound.

It has now been discovered that intermediates of Formula II may be converted to the desired final products through utilization of an alternative route which results in increased purity and yield. This new conversion may be diagrammatically represented as follows:

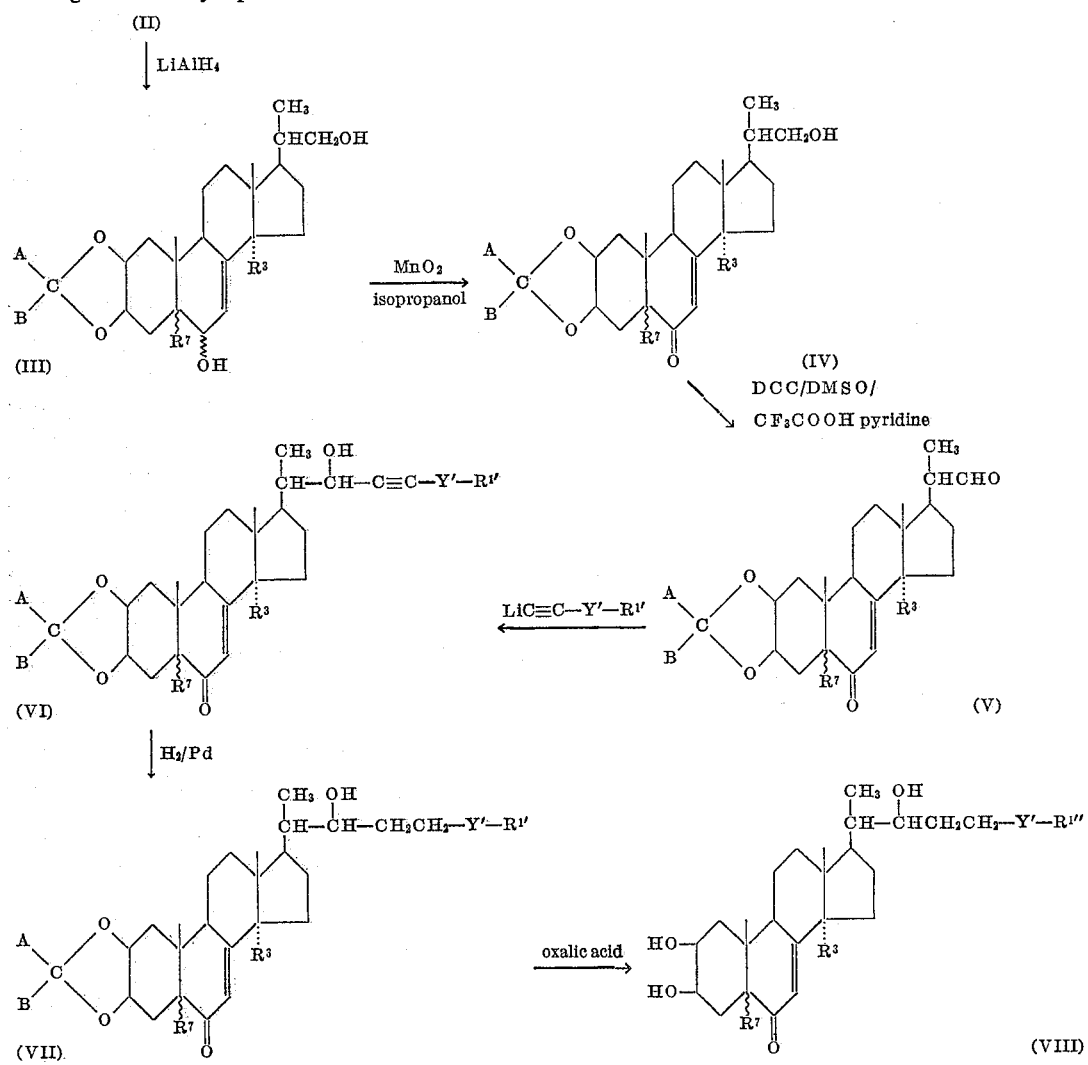

In the above, A, B, $R^3$ and $R^7$ are as previously defined. Y' is an alkylene chain of from 1 to 6 carbon atoms, and $R^{1'}$ is hydrogen or tetrahydropyranyloxy. In Formula VIII, $R^{1''}$ is hydrogen or hydroxy, the latter being generated upon the treatment of compounds of Formula VII with acid.

The above reaction sequence may be further understood through its specific application to the synthesis of ecdysone, the compound of Formula I wherein Y is the alkylene group —$CH_2CH_2$—$C(CH_3)_2$—, R' is hydroxy, $R^2$ is hydroxy, $R^3$ is hydroxy, $R^4$ is an oxygen atom, $R^5$ and $R^6$ are each hydrogen and $R^7$ is β-hydrogen. For this synthesis, an intermediate of Formula II wherein $R^3$ is hydroxy and $R^7$ is β-hydrogen is employed, with A and B preferably being methyl and the alkyl group of the ester function also being methyl. This intermediate is first reduced with a metal hydride, such as lithium aluminum hydride, to yield the 6-hydroxy-20β-hydroxymethylpregn-7-ene of Formula III. Selective back-oxidation of this compound as with manganese dioxide in the presence of isopropanol then forms the corresponding 20β-hydroxymethylpregn-7-en-6-one (IV) which is further oxidized to the aldehyde (V) with a mixed reagent comprising a carbodiimide such as dicyclohexylcarbodiimide, dimethyl sulfoxide, pyridine and a strong acid such as phosphoric acid or trifluoroacetic acid.

Alternatively, oxidation of both the 6 and 22-hydroxy groups may be performed at the same time using either reagent. Utilizing the carbonyl function of this aldehyde, alkylation is then performed, with a lithium salt of a substituted acetylene. In the case of ecdysone, this lithium derivative is 3-methyl-3-tetrahydropyranyloxybutyn-1-yl lithium [Y'=—$C(CH_3)_2$—, $R^{1'}$=tetrahydropyranyloxy]. Other alkyne derivatives, however, such as the lithium derivatives of 3,3-dimethylbut-1-yne, 3-methylbut-1-yne, but-1-yne, propyne, 4-tetrahydropyranyloxybut-1-yne, 3-tetrahydropyranyloxyprop-1-yne, 3-methyl-3-tetrahdropyranyloxyprop-1-yne, and the like are similarly employed. The product of this alkylation is then catalytically reduced with palladium to yield, in the case of the synthesis of ecdysone, a 2β,3β-alkylidenedioxy-14α,22-dihydroxy-25-tetrahydropyranyloxycholest-7-en-6-one ([VII] $R^{1'}$=tetrahydropyranoxy, Y'=isopropylidene, $R^3$=hydroxy, and $R^7$=β-hydrogen). Separation of the C–22 isomers is preferably performed at this stage, although this may also be done after the previous or subsequent step. Treatment of this product with hydrochloric, oxalic or formic acid for from about 30 minutes to about two hours then effects cleavage of the tetrahydropyranyloxy group, thus regenerating a hydroxy group, while extending this treatment to from about 10 to about 20 hours cleaves in addition the 2β,3β-alkylidenedioxy function, thereby regenerating hydroxy groups in the 2β and 3β positions as well. There is thus formed polyhydroxy steroids of Formula VIII, including ecdysone ($R^{1''}$=hydroxy, Y'=isopropylidene, $R^3$=hydroxy and $R^7$=β-hydrogen).

While the foregoing transformations have been described in connection with the synthesis of ecdysone, they may also be performed with compounds wherein $R^3$ is hydrogen and/or where $R^7$ is α-hydrogen or α-hydroxy.

So too as described above, the alkylation step may be performed with a variety of alkylating agents.

Other derivatives are also available through various modifications of this scheme. Thus, for example, the 22-hydroxy group in compounds of Formula VII may be oxidized to a keto group through the use of dicyclohexylcarbodiimide, trifluoroacetic acid, dimethyl sulfoxide and pyridine, as previously described. Alternatively, the 6-keto group may be reduced as through the action of sodium borohydride or tri-t-butoxide aluminum hydride to yield the corresponding 6α and 6β-isomers which are readily separated as through chromatography. Moreover, selective cleavage of the tetrahydropyranyloxy group as previously described, followed by treatment with a conventional acylating agent, yields the corresponding esters.

Thus, in addition to providing a synthetic route to the known insect hormone ecdysone, the foregoing processes provide compounds which also have insect hormone properties and which may be represented by the formula:

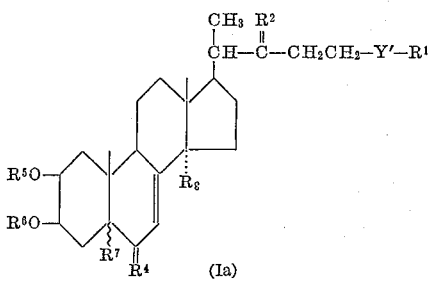

in which $R^1$, $R^2$, $R^3$, $R^4$, $R^5$, $R^6$, $R^7$ and $Y'$ are as previously defined, provided that when $R^1$, $R^2$ and $R^3$ are all hydroxy at least one of $R^4$ and $R^7$ is also hydroxy.

The following examples will serve to further typify the nature of this invention, but being presented solely for the purpose of illustration, these examples should not be construed as a limitation of the scope of this invention.

EXAMPLE 1

Fifty grams of 3β-acetoxy-22,23-bisnorchol-5-enoic acid methyl ester are dissolved in 500 ml. of hot (88%) formic acid and held at about 70° C. for about 0.5 hour. Thereafter, the solution is cooled to about 20° C. and 60 ml. of (30%) hydrogen peroxide is added cautiously and the resulting mixture is stirred for two hours, whereupon about 750 ml. of hot water is added. A gum is formed which is separated by decantation and filtration. The crude product is washed with water and dissolved in 800 ml. of hot methanol which contains a mixture of 38 g. of potassium hydroxide and 65 ml. of water. Saponification to the triol is complete after approximately two minutes. Neutralization of the solution with acetic acid followed by dilution with cold water results in the formation of a solid which is filtered and dried, affording 3β,5α,6β-trihydroxy-22,23-bisnorcholanoic acid methyl ester.

A solution containing 50 g. of 3β,5α,6β-trihydroxy-22,23-bisnorcholanoic acid methyl ester in aqueous dioxane (50 ml. water, 450 ml. dioxane) is treated at about 20° C. with 29 g. of N-bromosuccinimide (1.25 moles). The oxidation is complete after about 1.5 hours, whereupon excess N-bromosuccinimide is decomposed by the addition of aqueous sodium sulfite until the solution is substantially colorless. The addition of about 1.2 liters of cold water to the solution results in the formation of a white solid. The mixture is cooled in ice and the solid collected by filtration and dried by suction to yield 3β,5α-dihydroxy-6-keto-22,23-bisnorcholanoic acid methyl ester.

To a stirred solution of 38 g. of 3β,5α-dihydroxy-6-keto-22,23-bisnorcholanoic acid methyl ester in 150 ml. of pyridine, cooled to 0° C., is added 50 g. of p-toluenesulfonyl chloride. The mixture is allowed to stand at about 20° C. for about 16 hours and is then diluted slowly by the addition of water while cooling in an ice bath, whereupon a solid precipitates. The thus-formed solid is separated, washed with water to remove pyridine and dried, thus yielding 5α-hydroxy-6-keto-3β-p-toluenesulfonyloxy-22,23-bisnorcholanoic acid methyl ester, which may be further purified through recrystallization from methylene chloride:hexane.

To a mixture of 18 g. of lithium carbonate and 210 ml. of dimethyl acetamide at about 150° C. under nitrogen are added quickly 30 g. of the foregoing crystallized tosylate derivative. The mixture is maintained at a temperature of approximately 150° C. for 10 minutes and then cooled rapidly to about 0° C. The cooled mixture is added to cold water, yielding a solid which is collected by filtration, dried and extracted with benzene:water. These extracts are concentrated to give 5α-hydroxy-6-keto-22,23-bisnorchol-2-enoic acid methyl ester which is recrystallized from methylene chloride:hexane.

To a stirred mixture containing 326 mg. of 5α-hydroxy-6-keto-22,23-bisnorchol-2-enoic acid methyl ester, 10 ml. of dry acetic acid and 260 mg. of iodine is added 167 mg. of dry silver acetate, portionwise, over a one-hour period. Stirring is continued for approximately six hours, whereupon the reaction mixture is taken up in methylene chloride, filtered and washed with aqueous sodium thiosulfate and water. The methylene chloride is evaporated in vacuo at room temperature and the residue therefrom is treated with excess silver nitrate and 10% aqueous methanol for approximaely 10 minutes at about 70° C. The resulting reaction mixture is cooled, filtered, and the filtrate is taken up in methylene chloride. This organic solution is washed with water and evaporated under vacuum. The thus-obtained crude product is chromatographed on silica gel, eluting with ethyl acetate:hexane mixtures. The desired 2β,3β,5α-trihydroxy-6-keto-22,23-bisnorcholanoic acid methyl ester is obtained by mild alkaline hydrolysis of the most polar of the products from the column.

A mixture containing 170 mg. of 2β,3β,5α-trihydroxy-6-keto-22,23-bisnorcholanoic acid methyl ester and 2 ml. of 3:7 acetic anhydride:pyridine is allowed to stand at 90° C. for about three hours. The mixture is then concentrated to dryness under vacuum to afford 2β,3β-diacetoxy-5α-hydroxy-6-keto-22,23-bisnorcholanoic acid methyl ester which is recrystallized from methanol.

EXAMPLE 2

A solution containing 3.8 g. of 2β,3β-diacetoxy-5α-hydroxy-6-keto-22,23-bisnorcholanoic acid methyl ester, 16 ml. of acetic acid, 2.4 ml. of 15% hydrogen bromide in acetic acid, and 9 ml. of bromine in acetic acid (127 mg. of bromine per ml. of acetic acid) is stirred at room temperature for four hours. Thereafter, excess bromine is decomposed by the addition of 2% aqueous sodium sulfite and approximately 150 ml. of water is then added to complete precipitation. Filtration and drying by suction yields 7α-bromo-2β,3β-diacetoxy-5α-hydroxy-6-keto-22,23-bisnorcholanoic acid methyl ester which is recrystallized from methylene chloride:methanol.

A mixture of 450 mg. of this 7α-bromo steroid (VI), 12 ml. of dimethyl acetamide and 400 mg. of lithium carbonate is refluxed under an atmosphere of nitrogen for 12 minutes and thereafter rapidly cooled in an ice bath. The reaction mixture is washed, filtered, and the filtrate is extracted with methylene chloride. The methylene chloride extracts are thereafter washed with water and saturated sodium chloride solution and concentrated in vacuo to yield 2β,3β-diacetoxy-5α-hydroxy-6-keto-22,23-bisnorchol-7-enoic acid methyl ester and 2β,3β-diacetoxy-5α-hydroxy-6-keto-22,23-bisnorchol-8(14)-enoic acid methyl ester. These compounds may be separated at this point by chromatography on silica gel. Alternatively, the mixture may be carried forward and separated at a later stage.

A solution containing 5 ml. of acetic acid, 2 ml. of acetic anhydride and 450 mg. of 2β,3β-diacetoxy-5α-hydroxy-6-keto-22,23-bisnorchol-7-enoic acid methyl ester and 100 mg. of p-toluenesulfonic acid is stirred at room temperature for 3.5 hours and then added cautiously to dilute aqueous potassium bicarbonate and subjected to extraction with methylene chloride. The methylene chloride extracts are thereafter washed with water and saturated sodium chloride solution and concentrated to dryness under vacuum, yielding 6-keto-2β,3β,5α-triacetoxy-22,23-bisnorchol-7-enoic acid methyl ester.

This triacetate may also be obtained from the triol by successive acid-catalyzed acetylation, halogenation and dehydrohalogenation.

EXAMPLE 3

A mixture containing 140 mg. of selenium dioxide, 10 ml. of dry dioxane and 265 mg. of 6-keto-2β,3β,5α-triacetoxy-22,23-bisnorchol-7-enoic acid methyl ester is refluxed for four hours. Thereafter, the reaction mixture is cooled, filtered, and the filtrate washed with dilute aqueous potassium bicarbonate and extracted with methylene chloride. The methylene chloride extracts are washed with saturated sodium chloride solution, dried and filtered through Celite diatomaceous earth. The filtrate is concentrated to dryness, affording 14α-hydroxy-6-keto-2β,3β,5α-triacetoxy-22,23-bisnorchol-7-enoic acid methyl ester.

EXAMPLE 4

To a solution of 90 mg. of 14α-hydroxy-6-keto-2β,3β,5α-triacetoxy-22,23-bisnorchol-7-enoic acid methyl ester and 5 ml. of acetone is added 4 ml. of a 25% solution of chromous chloride in 1 N hydrochloric acid. The solution is allowed to stand for two minutes, whereupon it is poured into a water:methylene chloride mixture. The organic layer is separated and washed successively with dilute aqueous potassium bicarbonate, water, and saturated sodium chloride solution, dried over sodium sulfate, and concentrated to dryness, thus yielding 2β,3β-diacetoxy-14α-hydroxy-6-keto-22,23-bisnor-5α-chol-7-enoic acid methyl ester.

EXAMPLE 5

A mixture of 1 g. of 2β,3β-diacetoxy-14α-hydroxy-6-keto-22,23-bisnor-5α-chol-7-enoic acid methyl ester, 0.33 g. of potassium carbonate, and 100 ml. of 90% aqueous methanol is allowed to stand for approximately one hour at room temperature. Thereafter, ethyl acetate and saturated sodium chloride solution are added to the mixture and the layers are separated. The organic layer is neutralized, washed with water, dried over sodium sulfate and concentrated to dryness at room temperature to yield 2β,3β - 14α - trihydroxy - 6 - keto - 22,23 - bisnor - 5α-chol-7-enoic acid methyl ester.

EXAMPLE 6

A mixture containing 1 g. of 2β,3β,14α-trihydroxy-6-keto-22,23-bisnor-5α-chol-7-enoic acid methyl ester, 0.33 g. of potassium carbonate, and 100 ml. of 90% aqueous methanol is allowed to stand for approximately 20 hours at room temperature. The product is recovered by extraction with ethyl acetate in the manner described in the preceding paragraph and consists of a mixture of 2β,3β,14α - trihydroxy - 6 - keto - 22,23 - bisnor - 5β-chol-7-enoic acid methyl ester and the 5α-epimer which are separated by chromatography. The 5α-epimer may be recycled for further preparation of the 5β-compound.

EXAMPLE 7

A mixture containing 0.5 g. of 2β,3β,14α-trihydroxy-6-keto-22,23-bisnor-5β-chol-7-enoic acid methyl ester, 30 ml. of acetone, and 50 mg. of p-toluenesulfonic acid is allowed to stand at room temperature for approximately two hours. The reaction mixture is thereafter poured into cold, saturated aqueous potassium bicarbonate solution and extracted with ethyl acetate. The ethyl acetate extracts are washed with water to neutrality, dried over sodium sulfate and concentrated to dryness at room temperature to yield 2β,3β-isopropylidenedioxy-14α-hydroxy-6-keto-22,23-bisnor-5β-chol-7-enoic acid methyl ester.

A mixture of 1 g. of this product, 100 ml. of anhydrous tetrahydrofuran, and 2 g. of lithium aluminum tri-(t-butoxy) hydride is stirred for approximately two hours. The reaction mixture is stirred with ethyl acetate and then with saturated sodium chloride solution. The mixture is next filtered, and the filtrate is extracted with ethyl acetate. The ethyl acetate extracts are washed with water, dried over sodium sulfate, and concentrated to dryness under vacuum to yield 2β,3β-isopropylidenedioxy-6,14α-dihydroxy-22,23-bisnor-5β-chol-7-enoic acid methyl ester which may be separated into the 6α and 6β-isomers or may be used as a mixture of the two.

EXAMPLE 8

A solution of 100 mg. of 2β,3β-isopropylidenedioxy-6,14α-dihydroxy-22,23-bisnor-5β-chol-7-enoic acid methyl ester in 2 ml. of tetrahydrofuran is added over a 30-minute period to a stirred suspension of 200 mg. of lithium aluminum hydride in 20 ml. of tetrahydrofuran, maintaining a temperature of about 20° C. At the end of this time, the excess reagent is destroyed through the addition of 2 ml. of ethyl acetate followed by 1.4 ml. of water. After stirring for an additional 30 minutes, the mixture is filtered and the filtrate evaporated to yield 2β,3β-isopropylidenedioxy - 6,14α - dihydroxy-20β-hydroxymethylpregn-7-ene.

EXAMPLE 9

A solution of 10 mg. of 2β,3β - isopropylidenedioxy-6,14α - dihydroxy - 20β - hydroxymethylpregn-7-ene in 1 ml. of chloroform and 0.01 ml. of isopropanol is stirred under nitrogen with 100 mg. of active manganese dioxide for six hours. At the end of this time, the manganese dioxide is removed by centrifugation and the resultant supernatant is evaporated to yield 2β,3β - isopropylidenedioxy - 14α - hydroxy - 20β - hydroxymethylpregn-7-en-6-one.

EXAMPLE 10

A mixture of 19 mg. of 2β,3β - isopropylidenedioxy-14α - hydroxy - 20β - hydroxymethylpregn-7-en-6-one and 6 mg. of dicyclohexylcarbodiimide is added to a stirred mixture of 22 ml. of dimethyl sulfoxide, 2.5 ml. of pyridine and 0.5 ml. of trifluoroacetic acid, all of which have been thoroughly dried. After stirring for 70 minutes, the mixture is diluted with water and extracted with benzene. These extracts are dried over sodium sulfate and evaporated in vacuo to yield 2β,3β - isopropylidenedioxy-14α-hydroxy-20β-formylpregn-7-en-6-one.

EXAMPLE 11

To a mixture of 1.1 g. of 3 - methyl - 3 - tetrahydropyranyloxybut-1-yne in 8 ml. of tetrahydrofuran is added 2 ml. of 15% n-butyl lithium. When the reaction is complete, 0.72 ml. of this reagent is added over a one hour period to 38 mg. of 2β,3β - isopropylidenedioxy - 14α-hydroxy - 20β - formylpregn - 7-en-6-one in 0.6 ml. of tetrahydrofuran. At the end of this time, the reaction mixture is diluted with water and extracted with benzene. These extracts are dried over sodium sulfate and evaporated to dryness to yield 2β,3β - isopropylidenedioxy-14α,22(α and β) - dihydroxy - 25 - tetrahydropyranyloxy-5β-cholest-7-en-23-yn-6-one.

EXAMPLE 12

A solution of 28 mg. of 2β,3β - isopropylidenedioxy-14α,22(α and β) - dihydroxy - 25 - tetrahydropyranyloxy-5β-cholest-7-en-23-yn-6-one in 8 ml. of ethanol are hydrogenated for 36 hours in the presence of 200 mg. of 10% palladium-on-charcoal catalyst. At the end of this time, the mixture is filtered and the filtrate evaporated to yield 2β,3β - isopropylidenedioxy - 14α,22(α and β)-dihydroxy - 25 - tetrahydropyranyloxy - 5β - cholest-7-en-6-one. The 22α and 22β forms are separated via chromatography over silica, eluting 1:1 hexane:acetone.

EXAMPLE 13

To a solution of 20 mg. of 2β,3β - isopropylidenedioxy-14α,22β - dihydroxy - 25 - tetrahydropyranyloxy - 5β-cholest-7-en-6-one in 2 ml. of tetrahydrofuran is added 0.5 ml. of water and 0.04 mg. of oxalic acid. The mixture is allowed to stand for 36 hours, then is diluted with water and extracted with ethyl acetate. The dried extracts are evaporated to dryness to yield 2β,3β,14α,22β,25-pentahydroxy-5β-cholest-7-en-6-one.

In a similar fashion, there is obtained 2β,3β,14α,22α, 25-pentahydroxy-5β-cholest-7-en-6-one.

EXAMPLE 14

A mixture containing 265 mg. of 2β,3β - diacetoxy-5α - hydroxy - 6 - keto - 22,23 - bisnorchol - 7-enoic acid methyl ester, 140 mg. of selenium dioxide and 10 ml. of dry dioxane is refluxed for approximately four hours. The mixture is then cooled, filtered and the filtrate is washed with dilute aqueous potassium bicarbonate and extracted with methylene chloride. The methylene chloride phase is washed with saturated aqueous sodium chloride solution, dried and filtered through Celite diatomaceous earth. The filtrate is concentrated to dryness, affording 2β,3β - diacetoxy - 5α,14α - dihydroxy - 6 - keto-22,23-bisnorchol-7-enoic acid methyl ester.

Upon subjecting this compound to the hydrolysis procedure described in Example 5, there is obtained 2β,3β, 5α,14α - tetrahydroxy - 6 - keto - 22,23 - bisnorchol-7-enoic acid methyl ester. This compound is then sequentially treated according to the procedures described in Examples 7 through 13, thereby forming as the final product, 2β,3β,5α,14α,22β,25 - hexahydroxycholest - 7-en-6-one.

EXAMPLE 15

In a similar fashion to that described in the last paragraph of Example 14, 2β,3β - diacetoxy - 5α - hydroxy-6-keto-22,23-bisnorchol-7-enoic acid methyl ester is hydrolyzed according to the procedure of Example 5 and the resulting 2β,3β,5α - trihydroxy compound is then utilized in the procedures of Examples 7 through 13, sequentially, thereby yielding upon completion of the last step, 2β,3β,5α,22β,25 - pentahydroxycholest-7-en-6-one.

EXAMPLE 16

6-keto - 2β,3β,5α - triacetoxy - 22,23 - bisnorchol-7-enoic acid methyl ester is subjected sequentially to the procedures described in Examples 4 through 13, and upon completion of the steps therein described, there is obtained 2β,3β,22β,25-tetrahydroxy-5β-cholest-7-en-6-one.

What is claimed is:
1. The process for the preparation of compounds of the formula:

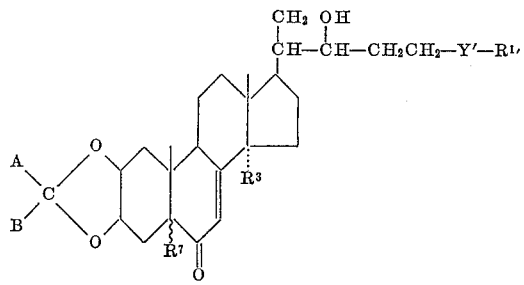

wherein
each of A and B is hydrogen or lower alkyl;
R¹' is hydrogen or tetrahydropyranyloxy;
R³ is hydrogen or hydroxy;
R⁷ is α-hydrogen, β-hydrogen or α-hydroxy; and Y' is alkylene of from 1 to 6 carbon atoms, which comprises treating a 20-formylpregn-7-ene of the formula:

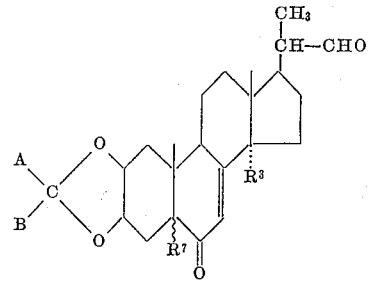

wherein A, B, R³ and R⁷ are as defined above, with a lithium derivative of a substituted acetylene of the formula HC≡C—Y'—R¹' wherein Y' and R¹' are as defined above, and catalytically hydrogenating the reaction product.

2. The process according to claim 1 wherein the hydrogenation catalyst is palladium-on-carbon.

3. The process according to claim 1 wherein each of A and B is methyl; R³ is hydroxy; R⁷ is β-hydrogen; and the grouping —Y'—R¹' has the structure

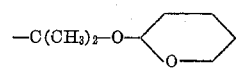

4. The process according to claim 3 wherein the hydrogenation catalyst is palladium-on-carbon.

5. The process for the preparation of a 2β,3β-alkylidenedioxy - 6 - keto - 20 - formylpregn-7-ene which comprises treating the corresponding 2β,3β - alkylidenedioxy-6 - hydroxy - 20 - hydroxymethylpregn-7-ene with manganese dioxide in the presence of isopropanol to yield the corresponding 6-keto compound and oxidizing the 20-hydroxymethyl group to a 20-formyl group through treatment with dicyclohexylcarbodiimide and dimethyl sulfoxide in the presence of a strong acid and an organic base.

6. The process according to claim 5 wherein 2β,3β-isopropylidenedioxy - 6,14α - dihydroxy - 20 - hydroxymethyl-5β-pregn-7-ene is treated with manganese dioxide in the presence of isopropanol to yield 2β,3β-isopropylidenedioxy - 6 - keto - 14α - hydroxy - 20-hydroxymethyl-5β-pregn-7-ene.

7. The process according to claim 6 including the step of oxidizing said 2β,3β - isopropylidenedioxy - 6 - keto-14α - hydroxy - 20 - hydroxymethyl - 5β - pregn-7-ene to 2β,3β - isopropylidenedioxy - 6 - keto - 14α - hydroxy-20-formyl-5β-pregn-7-ene with dicyclohexylcarbodiimide and dimethyl sulfoxide in the presence of trifluoroacetic acid and pyridine.

8. Compounds of the formula:

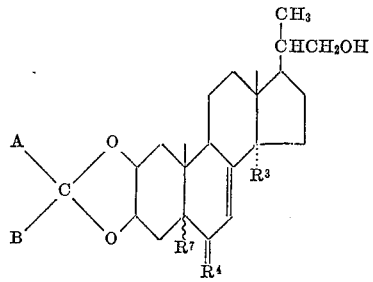

wherein
each of A and B is hydrogen or lower alkyl;
R³ is hydrogen or hydroxy;
R⁴ is an oxygen atom or (hydrogen, hydroxy); and
R⁷ is α-hydrogen, β-hydrogen or α-hydroxy.

9. Compounds according to claim 8 wherein each of A and B is methyl; $R^3$ is hydroxy; $R^4$ is (hydrogen, hydroxy); and $R^7$ is β-hydrogen.

10. The compound according to claim 8 wherein each of A and B is methyl; $R^3$ is hydroxy; $R^4$ is an oxygen atom; and $R^7$ is β-hydrogen.

11. Compounds of the formula:

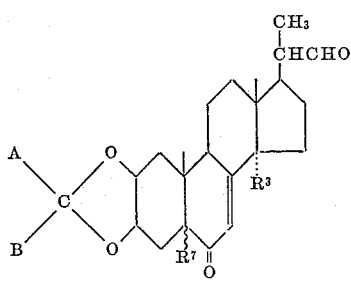

wherein each of A and B is hydrogen or lower alkyl;
$R^3$ is hydrogen or hydroxy; and
$R^7$ is α-hydrogen, β-hydrogen or α-hydroxy.

12. The compound according to claim 11 wherein each of A and B is methyl; $R^3$ is hydroxy; and $R^7$ is β-hydrogen.

13. Compounds of the formula:

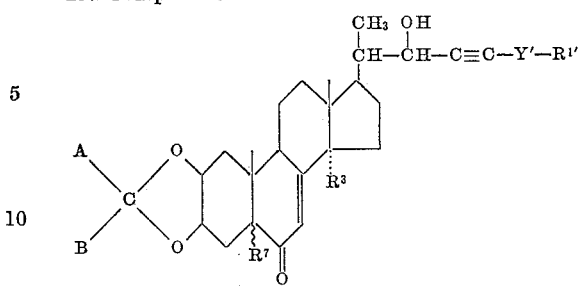

wherein each of A and B is hydrogen or lower alkyl;
$R^{1'}$ is hydrogen or tetrahydropyranyloxy;
$R^3$ is hydrogen or hydroxy;
$R^7$ is α-hydrogen, β-hydrogen or α-hydroxy; and
$Y'$ is alkylene of from 1 to 6 carbon atoms.

14. The compound according to claim 13 wherein each of A and B is methyl; $R^3$ is hydroxy; $R^7$ is β-hydrogen; and the grouping —$Y'$—$R^{1'}$ has the structure

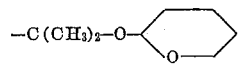

References Cited

Journal of the American Chem. Soc., Feb. 20, 1966, pages 862–863.

ELBERT L. ROBERTS, *Primary Examiner.*

UNITED STATES PATENT OFFICE
CERTIFICATE OF CORRECTION

Patent No. 3,354,152          November 21, 1967

John A. Edwards et al.

It is hereby certified that error appears in the above numbered patent requiring correction and that the said Letters Patent should read as corrected below.

Column 2, lines 41 to 52, for that portion of the formula reading $\overset{\vdots}{R^2}$ read $\overset{\vdots}{R^3}$ column 5, lines 20 to 31, the formula should appear as shown below instead of as in the patent:

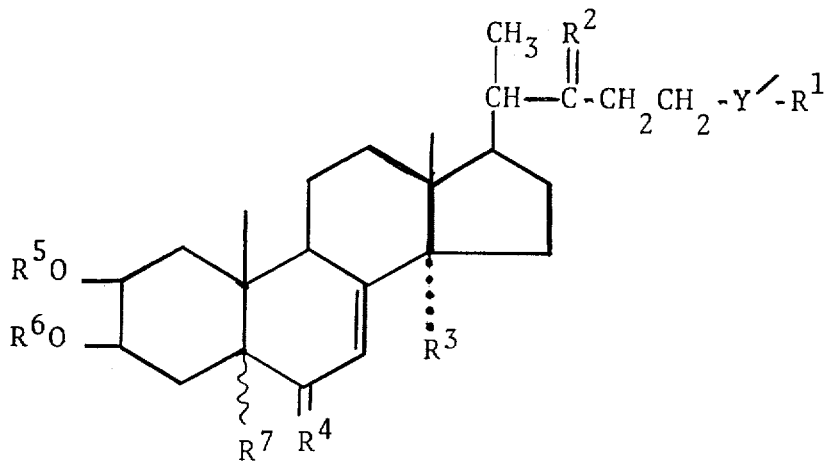

column 9, lines 58 to 70, for that portion of the formula reading:

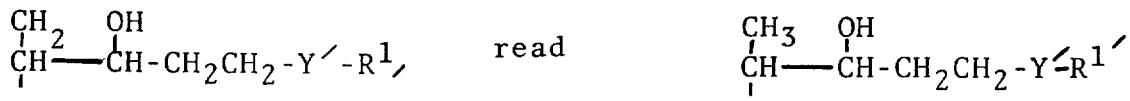

Signed and sealed this 7th day of January 1969.

(SEAL)
Attest:

EDWARD M. FLETCHER, JR.
Attesting Officer

EDWARD J. BRENNER
Commissioner of Patents